(12) United States Patent
Xu et al.

(10) Patent No.: US 11,982,065 B1
(45) Date of Patent: May 14, 2024

(54) METHOD FOR REINFORCING SOFT GROUND BY POST-GROUTING COMBINED WITH AIR-BOOSTED VACUUM PRELOADING

(71) Applicant: Nanjing Hydraulic Research Institute, Nanjing (CN)

(72) Inventors: Binhua Xu, Nanjing (CN); Ning He, Nanjing (CN); Yanbin Jiang, Nanjing (CN); Zhangchun Wang, Nanjing (CN); Zhikun Yan, Nanjing (CN); Yanzhang Zhou, Nanjing (CN); Guirong Zhang, Nanjing (CN); Yajun Qian, Nanjing (CN); Xinjie Zhan, Nanjing (CN); Zhongliu Zhang, Nanjing (CN); Bin He, Nanjing (CN); Denghua Li, Nanjing (CN); Yang Kong, Nanjing (CN); Yuting Xie, Nanjing (CN); Xiang Yin, Nanjing (CN)

(73) Assignee: Nanjing Hydraulic Research Institute, Nanjing (CN)

( * ) Notice: Subject to any disclaimer, the term of this patent is extended or adjusted under 35 U.S.C. 154(b) by 0 days.

(21) Appl. No.: 18/492,792

(22) Filed: Oct. 24, 2023

(30) Foreign Application Priority Data

Oct. 24, 2022 (CN) .......................... 202211303366.7

(51) Int. Cl.
*E02D 3/12* (2006.01)
*E02B 11/00* (2006.01)
*E02D 5/38* (2006.01)

(52) U.S. Cl.
CPC ................ *E02D 3/12* (2013.01); *E02B 11/00* (2013.01); *E02D 5/385* (2013.01);
(Continued)

(58) Field of Classification Search
CPC ..... E02D 3/10; E02D 2250/0053; E02D 3/12; E02D 2250/003; E02D 2300/0085;
(Continued)

(56) References Cited

U.S. PATENT DOCUMENTS

2014/0314497 A1* 10/2014 Wang .......................... E02D 5/34
405/240
2021/0156103 A1* 5/2021 Sun .......................... E02B 11/005

FOREIGN PATENT DOCUMENTS

CN 104631428 * 5/2015
CN 105239555 * 1/2016
(Continued)

*Primary Examiner* — Carib A Oquendo

(57) ABSTRACT

A method for reinforcing soft ground by post-grouting combined with pressurized vacuum preloading is proposed, by pre-burying prefabricated vertical drains and air-boosted pipes in granular material piles, and the air-boosted pipes are used as grouting pipes to reduce the number of times of piling, which not only improves the construction efficiency, but also reduces the structural disturbance of the soil and the influence of smear effect, thus reducing the impact on the radial permeability and the radial consolidation coefficients. The method does not use geotextile bags for granular materials, which can avoid the problem of forming a localized clogging area around the geotextile bags, and the method not only improves the efficiency of vacuum transfer in a pre-consolidation stage, but also improves the grouting effect in the later stage, effectively enhances the strength of soft soil and makes granular material piles and the surrounding soil form composite ground.

5 Claims, 2 Drawing Sheets

(52) U.S. Cl.
CPC ............ *E02D 2250/0007* (2013.01); *E02D 2250/003* (2013.01); *E02D 2300/0018* (2013.01); *E02D 2300/0079* (2013.01); *E02D 2300/0085* (2013.01)

(58) Field of Classification Search
CPC .... E02D 2300/0079; E02D 2300/0018; E02D 5/385; E02B 11/00
See application file for complete search history.

(56) References Cited

FOREIGN PATENT DOCUMENTS

| | | | |
|---|---|---|---|
| CN | 205636721 | * | 10/2016 |
| CN | 113279388 | * | 8/2021 |
| CN | 216108436 | * | 3/2022 |

* cited by examiner

METHOD FOR REINFORCING SOFT GROUND BY POST-GROUTING COMBINED WITH AIR-BOOSTED VACUUM PRELOADING

TECHNICAL FIELD

The disclosure relates to the technical field of ground engineering, and particularly to a method for reinforcing soft ground by post-grouting combined with air-boosted vacuum preloading.

BACKGROUND

The granular material pile method and the vacuum preloading method are two common physical reinforcement methods for soft ground. The granular material pile method is to replace a part of the soil with granular materials (gravel, pebbles, etc.) in the ground to increase the ground strength. When only granular material piles are used in the soft ground, the compaction effect of the soil between the granular material piles is poor, the side resistance of the granular material piles is low, and the reinforcement effect is not good. The vacuum preloading method uses a vacuum pumping system and uses a prefabricated vertical drain as a vacuum transmission path to improve soil strength by promoting drainage and consolidation of the soil.

Chinese patent with application number CN 201510627443.8 (corresponding to CN105239555A), and a title of the method for treating soft ground through a combination of bagged grouting gravel pile and vacuum preloading. This patent discloses a treatment and reinforcement method suitable for ultra-soft clay or newly dredged silt soil ground: first the vacuum preloading method is used to treat a shallow layer of a site; then the immersed tube method is used to carry out the construction of bagged gravel piles; secondly, the bagged gravel piles are used as vertical drainage channels to further treat the deep ground with straight-line vacuum preloading; finally, the bagged gravel piles are grouted through pre-embedded grouting pipes to form a rigid pile composite ground. This method is mainly used in the pretreatment of ultra-soft clay or newly dredged silt soil ground. Due to the weak cohesive force between soil particles of the ultra-soft clay and newly dredged silt soil ground, clay particles are easy to gather in geotextile bags of gravel piles under the action of vacuum suction and form a local clogging area near the geotextile bags, which not only hinders the transmission of vacuum in soil and reduces the reinforcement effect of vacuum preloading, but also affects the grouting effect in the later period, thus affecting the overall treatment effect. Therefore, the processing depth and scope of the method are limited. In addition, the above method needs to install prefabricated vertical drains before vacuuming in the early stage, and to install immersed pipes during the construction of bagged gravel piles. The setting of two vertical drainage channels not only makes the construction process complicated and inefficient, but also causes more obvious smear areas around the vertical drainage channels, which reduces the radial permeability coefficient of soil around the vertical drainage channels, thereby affecting the radial consolidation drainage efficiency and leading to poor treatment effect, especially when it is applied to soft ground with certain structure. Therefore, the above-mentioned patented method can only be applied to the shallow layer and early-stage treatment of ultra-soft soil and dredged fills, and cannot efficiently treat deep ultra-soft soil ground and structural soft ground, thus limiting its large-scale promotion and application.

SUMMARY

Aiming at the problems that the existing soft ground reinforcement treatment technology is easy to generate the clogging area, and the multiple installations will reduce the consolidation and drainage efficiency of the soil around the vertical drainage channels, and it is not suitable for treating deep ultra-soft ground and structural soft ground, the disclosure provides a method for reinforcing soft ground by post-grouting combined with air-boosted vacuum preloading, which is not easy to generate the clogging area, has little influence on the radial permeability coefficient of the soil around the vertical drainage channels, can be used for treating deep ultra-soft ground and structural soft ground, and has the advantages of simple construction technology, strong operability, economy, high efficiency and remarkable effect.

In order to achieve the above objectives, on the basis of setting up granular material piles, the disclosure adopts vacuuming combined with alternating pressurization in the early stage, and a reinforcement method of negative pressure combined with grouting in the later stage. Specifically, the following technical solutions are adopted.

A method for reinforcing soft ground by post-grouting combined with air-boosted vacuum preloading, includes the following steps 1 to 5.

In step 1, a site is leveled to form a construction work surface of granular material piles; ends of prefabricated vertical drains (PVDs) and air-boosted pipes are laid out to pipe shoe positions of pile pipes of an immersed pile driver in advance, the pile pipes are driven to a design depth, and then a delivery pipe is used to inject a filling material into each pile pipe and the filling material is vibrated; after the filling material reaches to a ground surface, the PVDs and the air-boosted pipes at a height of 0.5-1 m above ground are cut off, then the pile pipes are pulled out while avoiding to bring out the PVDs and the air-boosted pipes, and the granular material piles are formed; the PVDs and the air-boosted pipes are left in the granular material piles, and the above step is repeated to complete setting of the granular material piles within a ground treatment range, the granular material piles are arranged in rows and columns within the ground treatment range.

In step 2, main drainage pipes and main air-boosted pipes are laid out horizontally on the ground surface, and branch pipes and sealing joints are used to seal the PVDs and the air-boosted pipes left in the granular material piles with the main drainage pipes and main air-boosted pipes; the main drainage pipes are connected to vacuum pumps through sealed connecting pipes, and controllable valves are installed at joint positions; ends of the main air-boosted pipes are connected to air-boosted pumps, and other ends of the main air-boosted pipes are connected to grouting pumps, and controllable valves are installed at joint positions; the main drainage pipes on the ground surface form a vacuum drainage system with the branch pipes, the PVDs and the vacuum pumps; the main air-boosted pipes on the ground surface form an air-boosted drainage system with the branch pipes, the air-boosted pipes and the air-boosted pumps; and the main air-boosted pipes form a grouting system with the branch pipes, the air-boosted pipes and the grouting pumps.

Before the immersed pile driver piling, lower ends of the PVDs and the air-boosted pipes are fixed on the pipe shoe positions of the pile pipes by binding, and the lower ends of the PVDs and the air-boosted pipes are driven into the soft ground; and then the bulk material is injected into the pile pipes; and the PVDs and the air-boosted pipes are fixed in the granular material piles under the action of friction with the filling material.

One PVD and one air-boosted pipe are arranged in one granular material pile at the same time, in order to facilitate alternating vacuum pumping and pressurization reinforcement, there is no specific requirement for the layout positions of the PVDs and the air-boosted pipes, and it is only necessary to ensure that the PVDs and the air-boosted pipes are pre-buried in the granular material piles. Since the subsequent vacuum and pressurization are alternately carried out in the same pile, the layout positions are not affected.

In step 3, geotextiles and sealing membranes are laid out sequentially on a pipe network in the ground treatment range, and sealing ditches are dug around the ground treatment range, and the sealing membranes are pressed into the sealing ditches with clay or silt.

In step 4, vacuum drainage is carried out by turning on all the vacuum pumps in the ground treatment range and turning off all the air-boosted pumps and grouting pumps; when a soil consolidation degree increases slowly, the vacuum pumps and the air-boosted pumps in two adjacent rows are turned on alternately, that is, the vacuum pump connected to the PVDs in the discharge material piles in a first row is turned on, and at the same time the air-boosted pump connected to the air-boosted pipes in the first row is turned off, the air-boosted pump in a second row is turned on, and the vacuum pump in the second row is turned off at the same time; after a period of time, an alternation is carried out again, that is, the vacuum pump in the first row of the vacuum pumping system for vacuum drainage is turned off and the air-boosted pump in the first row is turned on, and the vacuum pump in the second row of the vacuum pumping system adjacent to the first row of the vacuum pumping system is turned on and the air-boosted pump in the second row is turned off, pre-pressurization drainage and air-boosted pre-pressurization drainage are performed alternately, pressurization is stopped when the soil consolidation degree reaches to a design requirement.

For example, when there is an inflection point in the semi-logarithmic relationship curve between consolidation degree and time, it is the performance of soil consolidation degree slowing down.

In step 5, all the air-boosted pumps and corresponding connecting valves in the ground treatment range are turned off, the vacuum pumps and grouting pumps and their corresponding connecting valves in adjacent two rows are turned on, that is, the vacuum pumps in first and third rows for vacuuming are turned on, and the grouting pumps in second and fourth rows at the same time are turned on; reinforcement grout is injected into the second and fourth row of the granular material piles and surrounding soil through the grouting pumps until a ground surface; and secondary grouting can be carried out if necessary.

Secondary grouting can be carried out when the slurry is lost or the slurry level drops seriously from the surface before solidification.

After the second and fourth rows of grouting are completed, the grouting pumps in the second and fourth rows are turned off, and the vacuum pumps in the first and third rows are turned off at the same time, and then the grouting pumps in the first and third rows are turned on, through the grouting pumps in the first and third rows, the reinforcement grout is injected into the granular material piles in the first and third rows and surrounding soil until the ground surface.

The PVDs and air-boosted pipes are embedded in the granular material piles, and the air-boosted pipes are used as the subsequent grouting pipes to reduce the number of pile driving, which can not only effectively improve the construction efficiency, but also reduce the structural disturbance and smear effect of soil mass, thus reducing the influence on the change of radial permeability coefficient and radial consolidation efficiency. The disclosure does not use the geotextile bag to load the granular material, and can avoid the problem of forming a local clogging area around the geotextile bag in the stage of combining vacuum pre-pressing with the prior art.

On the basis of the granular material piles, the disclosure adopts the vacuum-pumping combined alternating air-boosting, and increases the radial permeability coefficient of soil mass through the vacuum-combined grouting method in the grouting reinforcement stage, which can not only improve the vacuum transfer efficiency in the early stage of reinforcement, but also improve the grouting effect in the later stage, thus effectively improving the strength of soft soil and making the granular material piles and the surrounding soil to form an effective combination of composite ground.

In an embodiment, the granular material piles in two adjacent rows are arranged in a triangle, which facilitates the subsequent alternating turning-on and function of the vacuum system and the pressurization system.

In an embodiment, the filling material of the granular material piles in step 1 is gravel or crushed stone, and the selection of parameters such as the gradation should meet the strength and design requirements of the granular material piles, so that it can not only increase the bearing capacity of soft ground to a certain extent, but also provide radial drainage channels for deep soft soil to meet the drainage function.

In an embodiment, a wall of each air-boosted pipe is provided with a plurality of flower holes, and the plurality of flower holes are evenly spaced along a length direction of the wall, and the air-boosted pipe is used as a grouting pipe in step 5. The material of the air-boosted pipe and the layout of the flower holes need to meet the uniformity of pressure transfer in the vacuum and pressurization stage and the effectiveness of slurry transport in the grouting stage. The opening size of the flower hole needs to meet the effectiveness of slurry transport in the later stage, so that the flower hole does not block, and the uniform layout of the flower hole ensures the uniformity of pressure transfer. It is necessary to make corresponding tests according to the actual working conditions to give the suggested opening size of the flower hole.

In an embodiment, the reinforcement slurry used in step 5 is cement, or other binders, or reinforcement materials such as fibers, so that the strength of the pile can be improved as much as possible.

Compared with the prior art, the disclosure has the following technical effects:

By integrating PVDs, air-boosted pipes and granular material piles in construction, the disclosure reduces the number of constructing vertical drainage channels in construction, not only improves construction efficiency, but also reduces the smear effect formed by multiple construction, effectively reducing the influence on radial drainage consolidation and vacuum transfer efficiency, and improves the depth of soft soil reinforcement and treatment effect.

The soft ground reinforcement method of the disclosure combines the characteristics of the granular material piles and the air-boosted vacuum precompression method, avoids and reduces the influence of local clogging area on the radial consolidation efficiency, improves the vacuum transfer efficiency and improves the late grouting effect, and has good reinforcement effect on the soft ground. It can shorten the construction period, reduce the time cost and improve the reinforcement effect. It is not only suitable for the reinforcement treatment of large areas newly filled soil or newly ultra-soft soil, but also can be effectively applied to the natural soft ground with a certain sedimentary history and structure.

The disclosure can realize independent operation and control of vacuum pumping, pressurization and grouting, has simple construction technology, strong operability, economy and high efficiency, and can meet multiple application requirements of practical projects.

Figure 1:
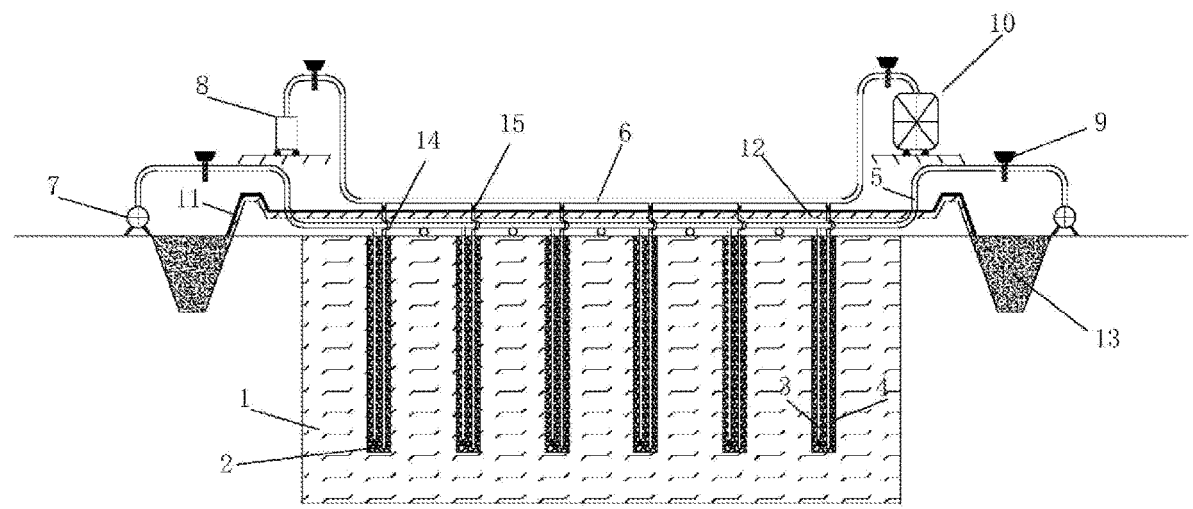
FIG. 1 illustrates a main view of a construction system of the disclosure.

Description of reference numerals: 1. soft ground; 2. granular material pile; 3. prefabricated vertical drain; 4. air-boosted pipe; 5. main drainage pipe; 6. main air-boosted pipe; 7. vacuum pump; 8. air-boosted pump; 9. controllable valve; 10. grouting pump; 11. sealing membrane; 12. geotextile; 13. sealing ditch; 14. branch pipe; 15. sealed connecting pipe; 16. first-row vacuum pumping system; 17. second-row vacuum pumping system; 18. third-row vacuum pumping system; 19. fourth-row vacuum pumping system; 20. first-row air-boosted system; 21. second-row air-boosted system; 22. third-row air-boosted system; 23. fourth-row air-boosted system; 24. first-row grouting system; 25. second-row grouting system; 26. third-row grouting system; 27. fourth-row grouting system.

DETAILED DESCRIPTION OF EMBODIMENTS

In order to make the purposes, technical schemes and advantages of the disclosure more clearly understood, the following combined with the attached drawings for a further detailed description of the method of the disclosure. The specific embodiments described herein are intended only to explain the disclosure and are not intended to qualify the disclosure.

A method for reinforcing soft ground by post-grouting combined with air-boosted vacuum preloading (ANTI)), includes the following steps 1 to 5.

In step 1, a site on a surface of the soft ground 1 is leveled to form a construction work surface of granular material piles 2; ends of prefabricated vertical drains (PVDs) 3 and air-boosted pipes 4 are installed to pipe shoe positions of pile pipes of a immersed pile driver in advance, the pile pipes are driven into a design depth, the PVDs 3 and the air-boosted pipes 4 are embedded to the design depth of the soft ground 1 with the construction of pile pipes, and then a delivery pipe is used to inject a filling material (i.e., coarse granular soil, such as sand, gravel, pebbles, etc.) into each pile pipe and the filling material is vibrated, and the body of the granular material pile 2 is formed; after the filling material reaches to a ground surface, the PVDs and the air-boosted pipes at a height of 0.5-1 m above ground are cut off, and then the pile pipes are pulled out while avoiding to bring out the PVDs and the air-boosted pipes, and the above step is repeated to complete setting of the granular material piles 2 within a ground treatment range. In the embodiment, the granular material piles are arranged in four rows and thirteen columns within the ground treatment range, and the adjacent two rows of granular material piles are arranged in a triangle to facilitate the subsequent turning-on and function of the cross-displacement of the vacuum system and the pressurization system. The granular material piles 2 are provided with the PVDs 3 and the air-boosted pipes 4 during the construction.

In step 2, main drainage pipes 5 and main air-boosted pipes 6 are laid out horizontally on the ground surface, and branch pipes 14 and sealing joints (i.e., sealed connecting pipes 15) are used to seal the PVDs 3 left in the granular material piles 2 with the main drainage pipes 5, and the air-boosted pipes 4 left in the granular material piles 2 with the main air-boosted pipes 6; the main drainage pipes 5 are connected to vacuum pumps 7 through sealed connecting pipes 15, and controllable valves 9 are installed at joint positions; ends of the main air-boosted pipes 6 are connected to air-boosted pumps 8, and other ends of the main air-boosted pipes 6 are connected to grouting pumps 10, and controllable valves 9 are installed at joint positions. The main drainage pipes 5 on the ground surface form a vacuum pumping drainage system with the branch pipes 14, the PVDs 3 and the vacuum pumps 7, the main air-boosted pipes 6 on the ground surface form an air-boosted drainage system with the branch pipes 14, the air-boosted pipes 4 and the air-boosted pumps 8, and the main air-boosted pipes 6 form a grouting system with the branch pipes 14, the air-boosted pipes 4 and the grouting pumps 10. The main drain pipes 5 and the branch pipes 14 form a vacuum pumping system pipe network, and the main air-boosted pipes 6 and the branch pipes 14 form an air-boosted system pipe network.

In step 3, geotextiles 12 are laid out on the pipe network in the ground treatment range, the number of layers can be determined according to the site situation and design requirements, and sealing membranes are laid out on the geotextiles 12, and sealing ditches 13 are dug around the ground treatment range, and the sealing membranes 11 are pressed into the sealing ditches 13 with clay or silt.

Figure 2:
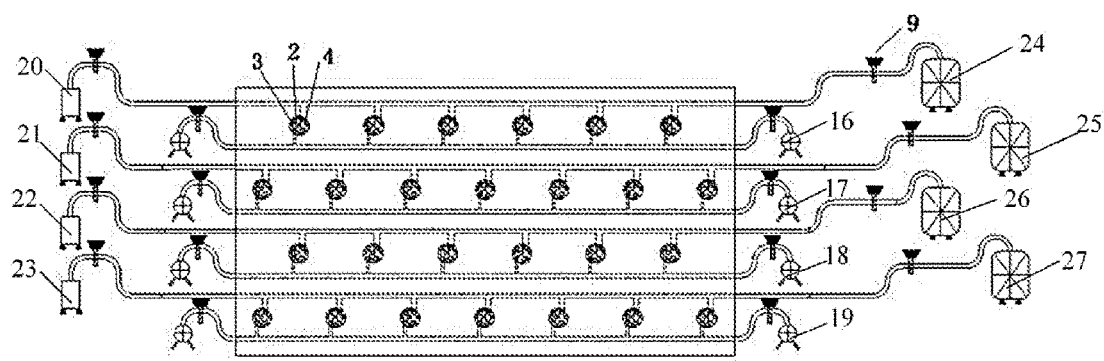
FIG. 2 illustrates a top view from a top direction of the ground treatment.

In step 4, as shown in FIG. 2, in the embodiment, there are four rows of granular material piles, which are successively named as the first row, the second row, the third row and the fourth row from top to bottom in the figure, and piles are named from left to right in the figure, the first pile in the first row and the first and second piles in the second row are arranged in a triangular structure, and the vacuum pumping system is composed of the main drainage pipe, vacuum pump, PVDs and branch pipes of each row, they are named as the first-row vacuum pumping system 16 (also referred to the first row of vacuum pumping system or the vacuum pumping system in the first row), the second-row vacuum pumping system 17 (also referred to the second row of vacuum pumping system or the vacuum pumping system in the second row), the third-row vacuum pumping system 18 (also referred to the third row of vacuum pumping system or the vacuum pumping system in the third row), the fourth-row vacuum pumping system 19 (also referred to the fourth row of vacuum pumping system or the vacuum pumping system in the fourth row). The main air-boosted pipe, air-boosted pump, air-boosted pipes and branch pipes of each row are composed of the air-boosted system. For the convenience of description, they are named as the first-row air-boosted system 20 (also referred to the first row of air-boosted system or the air-boosted system in the first row), the second-row air-boosted system 21 (also referred to the second row of air-boosted system or the air-boosted system in the second row), the third-row air-boosted system 22 (also referred to the third row of air-boosted system or the air-boosted system in the third row), and the fourth-row air-boosted system 23 (also referred to the fourth row of air-boosted system or the air-boosted system in the fourth row). The main air-boosted pipe, grouting pump, air-boosted pipes and branch pipes of each row are composed of the grouting system. For the convenience of description, they are named as the first-row grouting system 24 (also referred to the first row of grouting system or the grouting system in the first row), the second-row grouting system 25 (also referred to the second row of grouting system or the grouting system in the second row), the third-row grouting system 26 (also referred to the third row of grouting system or the grouting system in the second row) and the fourth-row grouting system 27 (also referred to the fourth row of grouting system or the grouting system in the fourth row).

In the early stage of reinforcement, all the vacuum pumps 7 of the first-row vacuum pumping system to fourth-row vacuum pumping system are turned on, and all the air-boosted pumps 8 and corresponding valves 9 of the first-row air-boosted system to fourth-row air-boosted system are turned off. When the consolidation degree reaches a certain degree and the soil consolidation degree increases slowly, vacuum pumps 7 of the first-row vacuum pumping system 16 and the third-row vacuum pumping system 18 are turned on (at this time, the first-row air-boosted system, first-row grouting system, third-row air-boosted system and third-row grouting system are turned off), the air-boosted pumps 8 of the second-row air-boosted system 21 and the fourth-row air-boosted system 23 are turned on (at this time, the second-row vacuum pumping system, second-row grouting system, fourth-row vacuum pumping system and fourth-row grouting system are turned off), and alternating after waiting for a period of air-boosting, that is, the air-boosted pumps 8 of the first-row air-boosted system 20 and the third-row air-boosted system 22 are turned on (at this time the first-row vacuum pumping system, first-row grouting system, third-row vacuum pumping system and third-row grouting system are turned off), the vacuum pumps 7 of the second-row vacuum pumping system 17 and the fourth-row vacuum pumping system 19 are turned on (at this time the second-row air-boosted system, second-row grouting system, fourth-row air-boosted system and fourth-row grouting system are turned off). Thus, the vacuum and air-boosting are separated and turned on alternately, and unloaded after the consolidation degree meets the design requirement.

Figure 3:
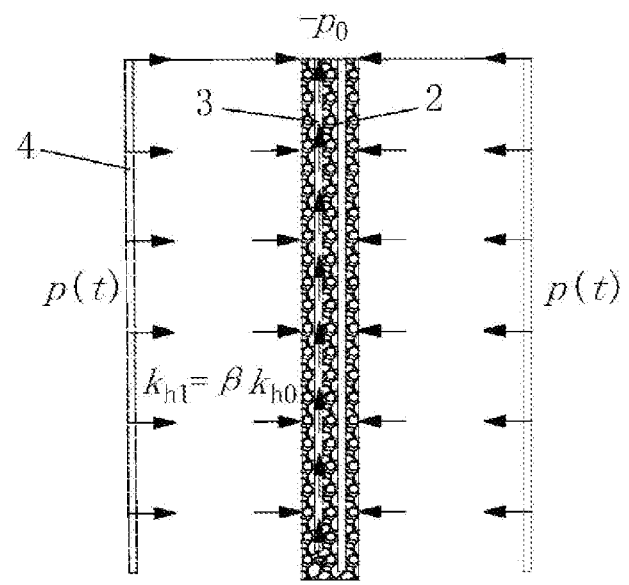
FIG. 3 illustrates a schematic diagram of pressure transfer in alternating air-boosting.

When the vacuum consolidation efficiency is relatively slow, the disclosure can not only increase the radial permeability coefficient of soil mass through the combined alternating preloading of vacuum and air-boosting. As shown in FIG. 3, air-boosting p(t) increases the radial permeability coefficient of soil mass from $k_{h0}$ to $k_{h1}$, wherein β is the increasing coefficient of permeability, which can promote the consolidation efficiency, and increase the effective stress through air-boosting. Thus, the shear strength and reinforcement effect of soil mass can be improved.

On the one hand, the granular material piles can better improve the overall strength of the soil mass in the early stage, and can also promote the drainage and consolidation of the soil mass. In the later stage of grouting, the slurry is injected into the granular material and the soil surrounding the pile at the same time, so that the granular material pile can form a higher strength pile. Thus, the composite ground with higher strength is formed with the soil, and the reinforcement effect and efficiency are better than the prior art (Chinese patent with application number CN 202110576172.3 and the title of the ground treatment system and construction method of the combined grouting with circulating pressure relief and precipitation). By means of this arrangement, the radial distance between the air-boosted pipe and the drainage vacuum system is turned off, and the air-boosting and negative pressure are alternately turned on in the granular material piles, so that the connection between the granular material in the granular material pile is tight and stable, and the connection between the pile and the surrounding soil is more uniform and stable, and the reinforcement efficiency is improved.

In step 5, the vacuum pumps 7 of the first-row vacuum pumping system 16 and the third-row vacuum pumping system 18 are turned on (at this time, the first-row grouting system, first-row air-boosted system, third-row grouting system and third-row air-boosted system are turned off), the grouting pumps 10 of the second-row grouting system 24 and the fourth-row grouting system 26 are turned on, and the vacuum system and the grouting system in the adjacent two rows are turned on. Through the grouting pipes, the reinforced grout is injected into the granular material piles to the ground surface by vacuum-combined grouting method (such as cement and other binders, or reinforcement materials such as fiber), and secondary grouting can be carried out if necessary. After the grouting of granular material piles in the second and fourth rows is completed by the vacuum-combined grouting method, the vacuum pumping systems in the first and third rows are turned off and the grouting system and its corresponding valves are turned on.

The above embodiments are only used to explain the specific embodiments of the disclosure and are not used to define the disclosure.

What is claimed is:

1. A method for reinforcing soft ground by post-grouting combined with air-boosted vacuum preloading (AVP), comprising:

step 1, leveling a site to form a construction work surface of granular material piles; laying out ends of prefabricated vertical drains (PVDs) and air-boosted pipes to pipe shoe positions of pile pipes of an immersed pile driver in advance, driving the pile pipes to a design depth, and then using a delivery pipe to inject a filling material into each pile pipe and vibrating the filling material; after the filling material reaches to a ground surface, cutting off the PVDs and the air-boosted pipes at a height of 0.5-1 m above ground, then pulling out the pile pipes while avoiding to bring out the PVDs and the air-boosted pipes, and forming the granular material piles; the PVDs and the air-boosted pipes being left in the granular material piles, and repeating the above step to complete setting of the granular material piles within a ground treatment range, the granular material piles being arranged in rows and columns within the ground treatment range;

step 2, laying out main drainage pipes and main air-boosted pipes horizontally on the ground surface, and using branch pipes and sealing joints to seal the PVDs and the air-boosted pipes left in the granular material piles with the main drainage pipes and the main air-boosted pipes; connecting the main drainage pipes to vacuum pumps through sealed connecting pipes, and installing controllable valves at joint positions; connecting ends of the main air-boosted pipes to air-boosted pumps, connecting other ends of the main air-boosted pipes to grouting pumps, and installing controllable valves at joint positions; wherein the main drainage pipes on the ground surface form a vacuum pumping system with the branch pipes, the PVDs and the vacuum pumps; the main air-boosted pipes on the ground surface form an air-boosted system with the branch pipes, the air-boosted pipes and the air-boosted pumps; and the main air-boosted pipes form a grouting system with the branch pipes, the air-boosted pipes and the grouting pumps;

step 3, laying out geotextiles and sealing membranes sequentially on a pipe network in the ground treatment range, and digging sealing ditches around the ground treatment range, and pressing the sealing membranes into the sealing ditches with clay or silt;

step 4, performing vacuum drainage by turning on all the vacuum pumps in the ground treatment range and turning off all the air-boosted pumps and the grouting pumps; when a soil consolidation degree increases slowly, turning on the vacuum pumps and the air-boosted pumps in two adjacent rows alternately, that is, turning on the vacuum pump connected to the PVDs in the discharge material piles in a first row, and at the same time turning off the air-boosted pump connected to the air-boosted pipes in the first row, turning on the air-boosted pump in a second row, and turning off the vacuum pump in the second row at the same time; after a period of time, performing an alternation again, that is, turning off the vacuum pump in the first row of the vacuum pumping system for vacuum drainage and turning on the air-boosted pump in the first row, and turning on the vacuum pump in the second row of the vacuum pumping system adjacent to the first row of the vacuum pumping system and turning off the air-boosted pump in the second row, performing vacuum pre-pressurization drainage and air-boosted pre-pressurization drainage alternately, stopping pressurization when the soil consolidation degree reaches to a design requirement;

step 5, turning off all the air-boosted pumps and corresponding connecting valves in the ground treatment range, turning on the vacuum pumps and the grouting pumps and their corresponding connecting valves in adjacent two rows, that is, starting the vacuum pumps in first and third rows for vacuuming, and turning on the grouting pumps in second and fourth rows at the same time; injecting reinforcement grout into the second and fourth row of the granular material piles and surrounding soil through the grouting pumps until the ground surface;

after the second and fourth rows of grouting are completed, turning off the grouting pumps in the second and fourth rows, and turning off the vacuum pumps in the first and third rows at the same time; and then turning on the grouting pumps in the first and third rows, through the grouting pumps in the first and third rows, injecting reinforcement grout into the granular material piles in the first and third rows and surrounding soil until the ground surface.

2. The method as claimed in claim 1, wherein the granular material piles in two adjacent rows are arranged in a triangle.

3. The method as claimed in claim 1, wherein the filling material of the granular material piles in step 1 is gravel or crushed stone.

4. The method as claimed in claim 1, wherein a wall of each air-boosted pipe is provided with a plurality of flower holes, and the plurality of flower holes are evenly spaced along a length direction of the wall, and the air-boosted pipe is used as a grouting pipe in step 5.

5. The method as claimed in claim 1, wherein the reinforcement slurry used in step 5 is cement, binder or another material capable of increasing a pile strength.

\* \* \* \* \*